(12) United States Patent
Wendl et al.

(10) Patent No.: US 6,540,632 B1
(45) Date of Patent: Apr. 1, 2003

(54) WHEEL DRIVE

(75) Inventors: Harald Wendl, Vilshofen (DE); Max Bachmann, Bad Waldsee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/018,411

(22) PCT Filed: Jul. 7, 2000

(86) PCT No.: PCT/EP00/06439

§ 371 (c)(1),
(2), (4) Date: Dec. 13, 2001

(87) PCT Pub. No.: WO01/03964

PCT Pub. Date: Jan. 18, 2001

(30) Foreign Application Priority Data

Jul. 13, 1999 (EP) ............................................ 199 32 587

(51) Int. Cl.[7] ......................... F16H 3/72; F16H 37/06; F16H 35/00; B60K 1/00
(52) U.S. Cl. ........................... 475/5; 475/153; 74/390; 180/65.5; 180/65.6
(58) Field of Search ............................ 475/5, 2, 4, 8, 475/10, 153; 74/390, 391; 180/65.5, 65.6, 65.7

(56) References Cited

U.S. PATENT DOCUMENTS

| 5,014,800 A | * | 5/1991 | Kawamoto et al. | 180/65.5 |
| 5,382,854 A | * | 1/1995 | Kawamoto et al. | 310/67 R |
| 6,006,870 A | * | 12/1999 | Gazyakan et al. | 188/72.1 |
| 6,139,464 A | * | 10/2000 | Roske | 475/331 |
| 6,328,123 B1 | * | 12/2001 | Niemann et al. | 180/65.5 |

FOREIGN PATENT DOCUMENTS

| DE | 846 856 | 8/1952 | |
| DE | 2 033 222 | 1/1972 | B60K/17/08 |
| DE | 1 455 654 | 5/1972 | F16H/1/48 |
| DE | 24 18 810 | 10/1975 | F16H/1/22 |
| DE | 41 12 624 C1 | 10/1992 | B60K/1/00 |
| DE | 19640146 C1 | * 1/1998 | B60B/27/04 |
| DE | 197 09 577 A1 | 10/1998 | B60K/7/00 |
| DE | 197 16 538 A1 | 10/1998 | B60K/17/14 |
| EP | 0 523 472 A2 | 1/1993 | B60K/17/04 |
| GB | 1 302 504 | 1/1973 | F16H/1/20 |
| GB | 1 457 979 | 12/1976 | F16H/1/02 |
| WO | 97/28980 | 8/1997 | B60K/17/04 |

OTHER PUBLICATIONS

U.S. publication 2002/0134597 filed Jan. 2002 by Mann et al.*

* cited by examiner

Primary Examiner—Sherry Estremsky
Assistant Examiner—Tisha D. Lewis
(74) Attorney, Agent, or Firm—Davis & Bujold, P.L.L.C.

(57) ABSTRACT

A wheel drive preferably used in a low-platform bus for driving the wheels is driven by a drive motor (1) eccentrically arranged relative to the wheel axle (12) and a gearwheel (2). The driven gearwheel (2) of a reduction gear (3) is in intermeshing connection with two additional gearwheels (6) and one outer central wheel (5) in a manner such that the drive torque is distributed onto the gearwheels (6) and the outer central wheel (5) and the driven gearwheel (2) can be floatingly supported so that a uniform load distribution results.

6 Claims, 3 Drawing Sheets

WHEEL DRIVE

FIELD OF THE INVENTION

The invention relates to a wheel drive for mobile vehicles preferably omnibuses and particularly low platform buses.

BACKGROUND OF THE INVENTION

By their nature wheel drives stand out by the fact that they can be installed in the vehicle so as to occupy little space in axial direction in order, for example, to obtain the largest possible gear width in a bus. For this purpose, wheel drives are configured so that the main mover part can be lodged within a rim of the wheel. Wheel drives can be actuated either via a common drive motor, which communicates with the wheel drive, via a torque divider or via a drive motor directly connected with the wheel drive.

EP 0 523 472 B1 discloses a gantry axle for a bus where, in order to obtain a gantry clearance as large as possible, a drive motor actuates a gearwheel, via a torque divider which, on one side, communicates with an outer central wheel and, on the other, drives a gearwheel which, as intermediate wheel, actuates one other gearwheel which, in turn, is connected with the outer central wheel, the outer central wheel forming the output. By the driven gearwheel being in intermeshing connection directly with the outer central wheel, a very large gantry clearance is obtained, but the tooth loads on the driven gearwheels are very heavy, since the driven gearwheel has only two opposite meshings of teeth through which the torque of the driven gearwheel can be generated. Thereby the driven gearwheel, the same as the other gearwheels and the outer central wheel, must be designed with a diameter such that they can be situated only outside the rim.

The invention is based on the problem of providing a wheel drive by which a largest possible gantry clearance can be implemented and which can be so compactly designed that at least the reduction gear can be situated within the diameter of the rim and the largest possible gear width is obtained in the vehicle by the compact axial design of the wheel drive.

SUMMARY OF THE INVENTION

According to the invention, the wheel drive consists of a reduction gear in which a driven gearwheel is in intermeshing connection, on one side, with an outer central wheel and, on the other side, with at least two gearwheels which are in operative connection with the outer central wheel. The teeth meshings of the outer central wheel with the driven gearwheel and the teeth meshings of the other gearwheels with the driven gearwheel are disposed so that the lines of action of the radial forces generated by the teeth meshings with the driven gearwheel strike on the axis of rotation of the driven gearwheel. By the driven gearwheel, having at least three teeth meshings by which the torque, can divide itself, it is possible to design the driven gearwheel, the other gearwheels and the outer central wheel compactly enough so that the reduction gear can be situated within the diameter of the rim. By the lines of action of the radial forces striking on the axle of rotation of the driven gearwheel, it is possible to omit a bearing of large dimensions of the driven gearwheel, since the driven gearwheel can be supported either floatingly or via a small bearing. Due to the floating bearing of the driven gearwheel and at least three teeth meshings, the action lines of which strike on the axis of rotation of the driven gearwheel, the driven gearwheel can adjust under torque load so as uniformly carry all teeth meshings whereby the reduction gear can be more compactly designed. The gearwheels which are in intermeshing connection with the driven gearwheel are preferably disposed so that the angle resulting from the connection of the central points of rotation of the two gearwheels with the central point of rotation of the driven gearwheel is less than 120°. By the angle being designed of less than 120°, it is not possible to uniformly distribute the torque load onto the three teeth meshings but onto the teeth meshing of the driven gearwheel with the outer central wheel, since here the curvature ratios are more favorable for loading with a great torque than the teeth meshing of the driven gearwheel with the other gearwheels. Hereby the other gearwheels can be designed more compact. The driven gearwheel is preferably actuated via an electric drive motor. But the driving can also result via an input shaft from a torque divider. The outer central wheel which forms the output can be connected directly with the output of the wheel drive or drive an inner central wheel of a planet step whereby the total ratio is increased and the drive motor can be designed more compact. By it being possible very compactly to design the reduction gear as consequence of several teeth engagements on the driven gearwheel and obtaining a very large gantry clearance, it is possible to situate within the rim diameter a brake which is connected with the output of the wheel drive and place one part of the actuation device of the brake within the rim diameter so as to create a wheel drive more compact in axial direction. By virtue of the arrangement of the reduction gear of the brake, the same as of the actuation device thereof, and of one part of the drive motor within the rim wherein the mass center of gravity is located on the inner side of the wheel, an improvement of the suspension properties is obtained.

BRIEF DESCRIPTION OF THE DRAWINGS

The invention will now be described, by way of example, with reference to the accompanying drawings in which.

DETAILED DESCRIPTION OF THE INVENTION

Figure 1:
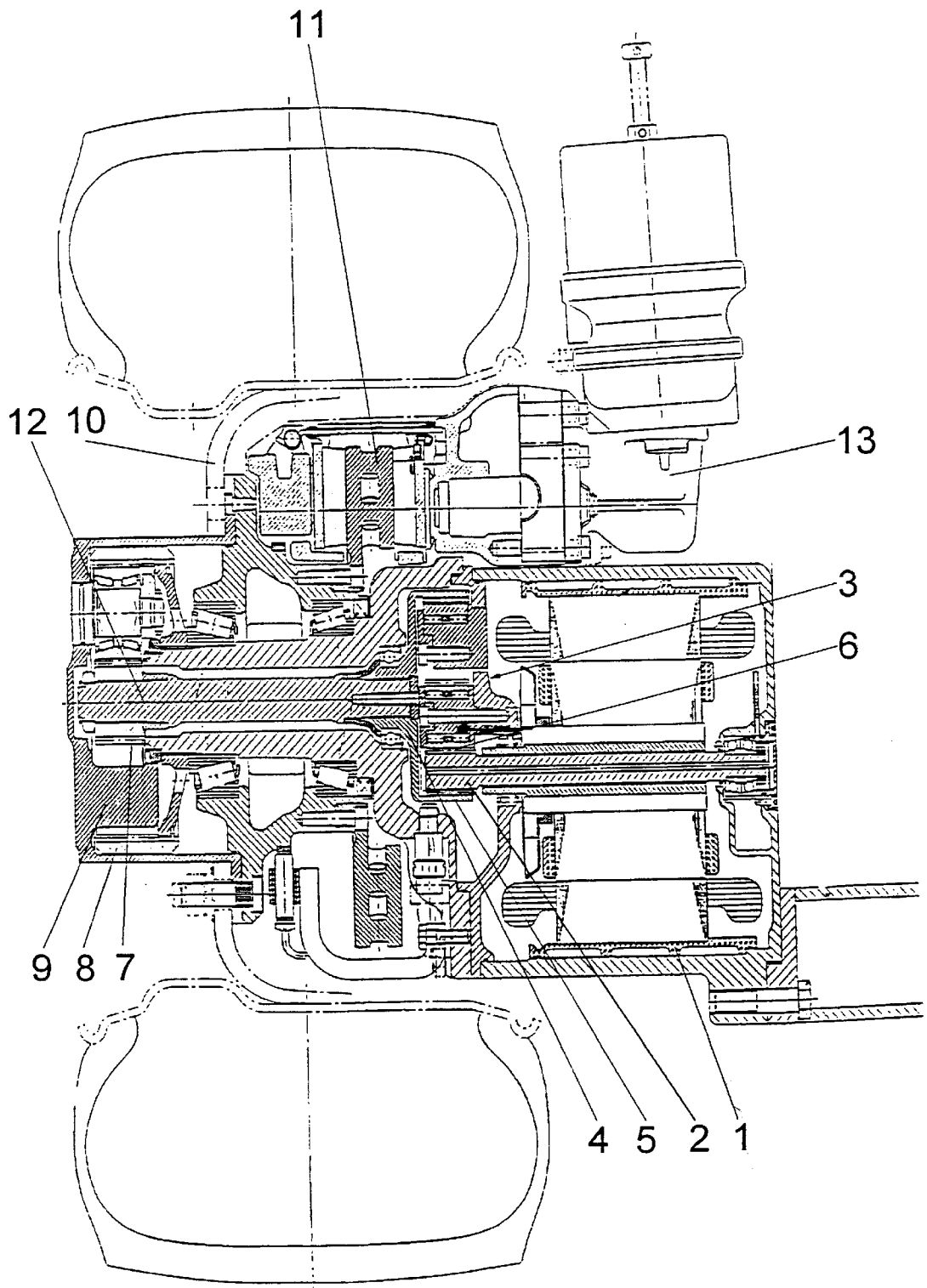
FIG. 1 a wheel drive where an electric motor drives one wheel via reduction gears and FIG. 2 and FIG. 3 are diagrammatic representations of a reduction gear in which the drive mechanism is eccentrically situated.
Figure 2:
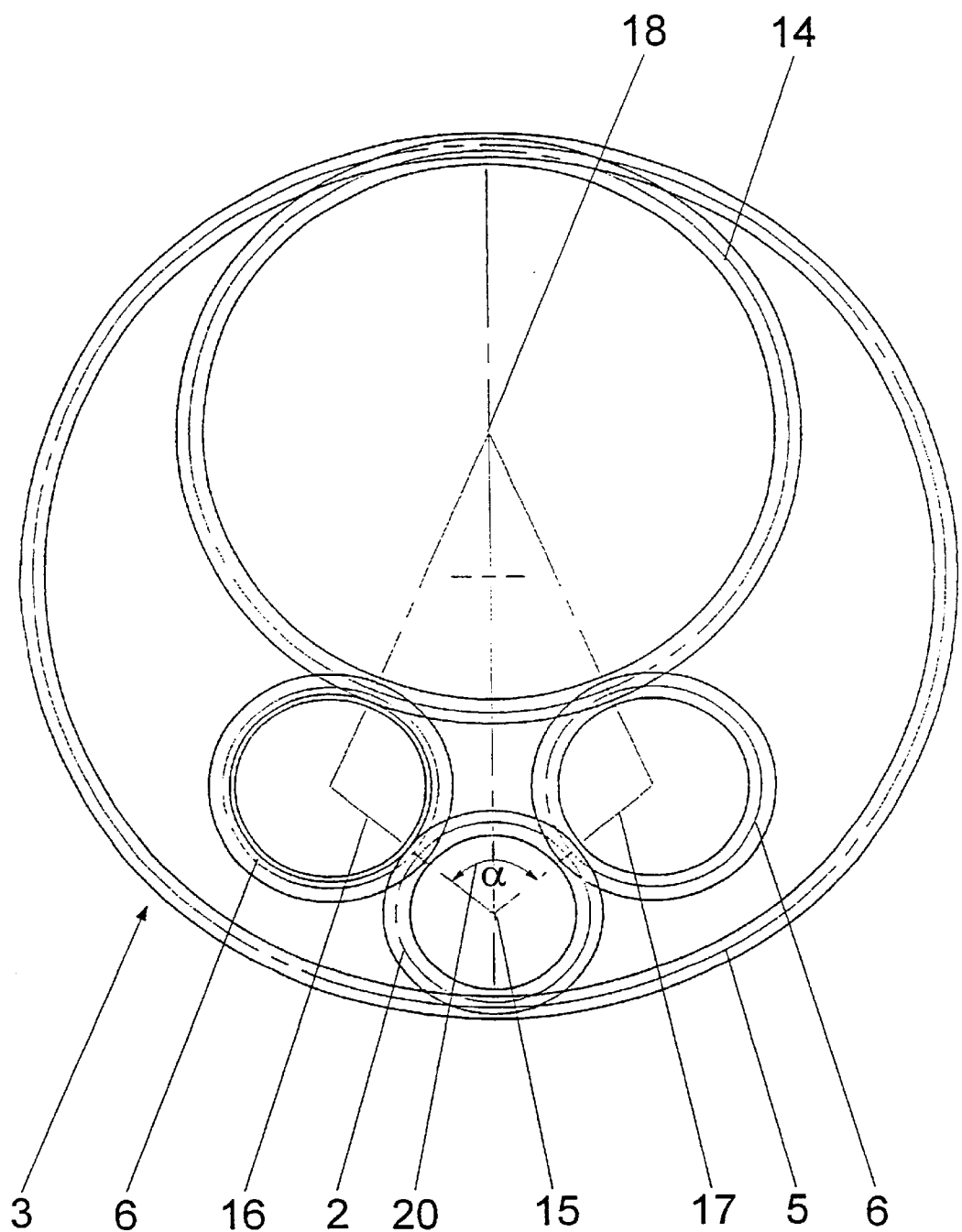
Figure 3:
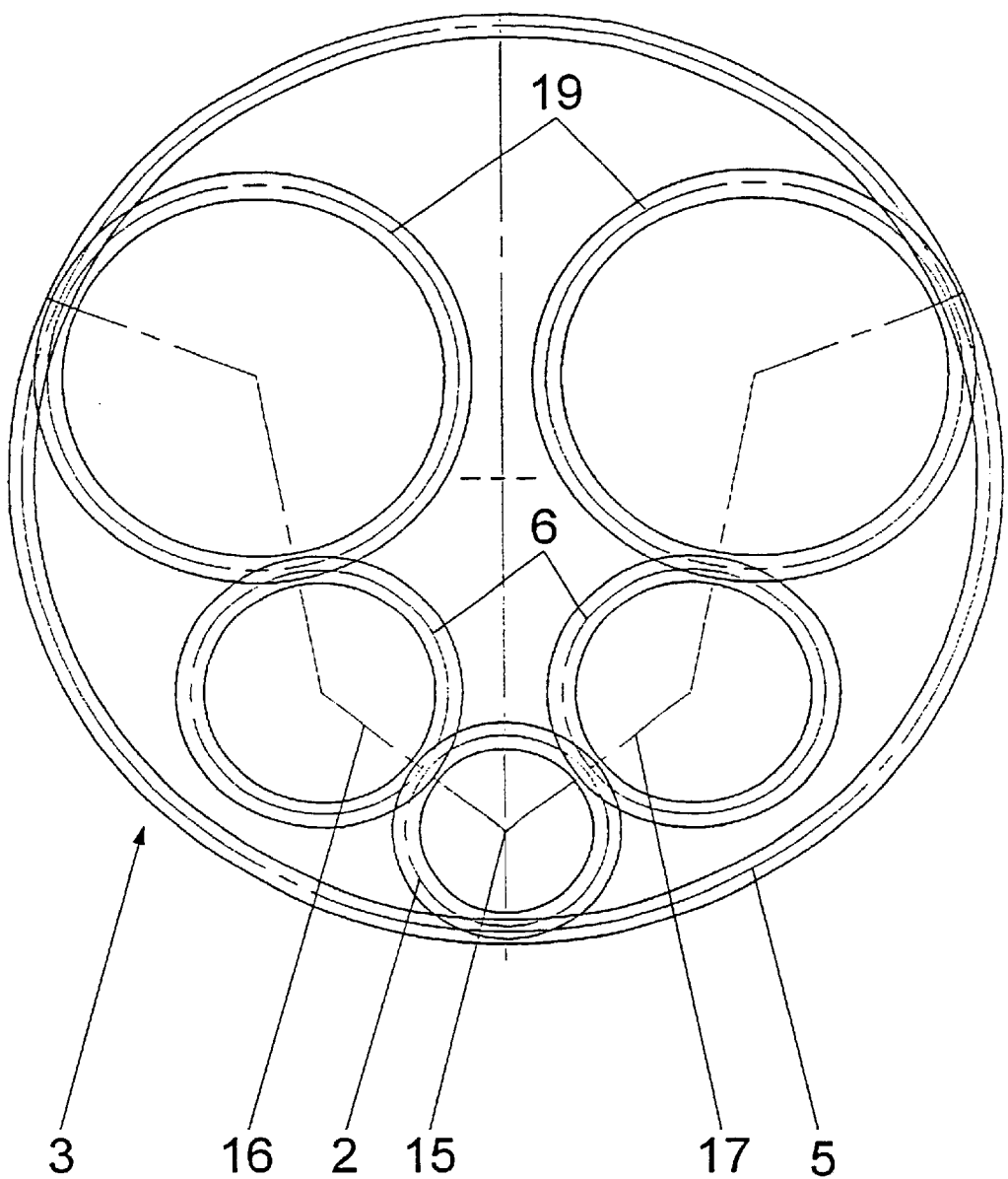

FIG. 1:

A drive motor 1, which can be designed as a electric or hydraulic motor, is connected with a driven wheel 2 of a reduction gear 3, the driven gearwheel 2 being situated eccentrically relative to the output 4 which forms an outer central wheel 5. But the driven gearwheel 2 can also be driven by a differential gear. The driven central gearwheel 2 is on one side in intermeshing connection with the outer central wheel 5 and on the other side in intermeshing connection with additional gearwheels 6 which are also in intermeshing connection with the outer central wheel 5. The output 4 is connected with an inner central wheel 7 of a planet step 8, the planet carrier 9 of which forms the output and is connected with a rim 10. The reduction gear 3, the planet step 8 and a brake 11 are placed within the rim 10 whereby a very compact wheel drive is created. By the driven gearwheel 2 being eccentrically disposed in relation to the wheel axle 12 and it being possible by the torque distribution very compactly to design the reduction gear 3, it is possible to situate part of the actuation device 13 of the brake 11 within the rim 10 whereby, when the wheel drive is installed in a low-platform bus, a large gear width can be achieved. There is preferably used an actuation device 13 whose cylinder is disposed at right angles with the wheel axle 12 in order to enlarge the gear width of the bus. The actuation device 13 thus forms an area, which is disposed in parallel with the wheel axle 12 and is for the most part situated within the wheel rim 10, and an area which is situated outside the wheel rim 10 at right angles with the wheel axle 12 but in the axial area of the drive motor 1. The driven gearwheel 2 is situated floatingly or substantially floatingly in the reduction gear 3 whereby an optimal suspension part of the gearing results.

FIG. 2:

A driven gearwheel 2 of a reduction gear 3 is in intermeshing connection with an outer central wheel 5 and two additional gearwheels 6 which are operatively connected via a gearwheel 14 with the outer central wheel 5. The driven gearwheel 2 floatingly or substantially floatingly supported is in intermeshing connection with the gearwheels 6 and the outer central wheel 5 which is disposed so that the resulting radial forces, due to the teeth meshings, strike on the axis of rotation 15 and thus compensate each other. The torque of the driven gearwheel 2 is distributed by the intermeshing connection with two gearwheels 6 and an outer central wheel 5 whereby the reduction gear 3 can be designed compact. The angle 20 formed by the lines 16 and 17 is designed so as to amount to less than or equal to 120°. It is hereby ensured that during the meshing of teeth of the driven gearwheel 2 with the gearwheel 6, lighter loads appear than in the meshing of teeth of the driven gearwheel 2 and the outer central wheel 5.

FIG. 3:

The driven gearwheel 2 of the reduction gear 3 is in intermeshing connection with two gearwheels 6 and an outer central wheel 5. The gearwheels 6 intermesh with two gearwheels 19 which in turn are in intermeshing connection with the outer central wheel 5. The lines 16 and 17 strike on the axis of rotation 15 of the driven central wheel 2. The driven gearwheel 2 can hereby be disposed floatingly or substantially floatingly.

| Reference numeral | |
|---|---|
| 1 drive motor | 11 brake |
| 2 driven gearwheel | 12 wheel axle |
| 3 reduction gear | 13 actuation device |
| 4 output | 14 gearwheel |
| 5 outer central wheel | 15 axis of rotation |
| 6 gearwheel | 16 line |
| 7 inner central wheel | 17 line |
| 8 planet step | 18 axis of rotation |

| -continued | |
|---|---|
| Reference numeral | |
| 9 planet carrier | 19 gearwheel |
| 10 rim | 20 angle |

What is claimed is:

1. A wheel drive having a gearwheel (2) driven eccentrically relative to a wheel axle and in intermeshing connection with an outer central wheel (5), and said outer central wheel (5) is in operative connection with a output (4, 9), and said driven gearwheel (2) is in intermeshing connection with at least two other gearwheels (6) which are in operative connection with said outer central wheel (5) and are disposed so that lines (16, 17), which are disposed perpendicular to a line of action by the peripheral forces generated by the meshing connections of said driven gearwheel (2), strike on an axis of rotation (15) of said driven gearwheel (2), wherein said outer central wheel (5) is connected with the output via a planet step (8) and an actuation device (13) of a brake (11) has an area disposed parallel to said wheel axle (12) and situated substantially within a wheel rim (10) and has an area situated at right angles with said wheel axle (12) and placed outside a wheel rim (10).

2. The wheel drive according to claim 1, wherein said driven gearwheel (2) is driven by an electric motor or a hydraulic motor or via a differential gear.

3. The wheel drive according to claim 1, wherein the at least two other gearwheels (6), which are in intermeshing connection with said driven gearwheel (2), are in intermeshing connection with a gearwheel (14) which is in intermeshing connection with said outer central wheel (5) and whose center of rotation (18) lies upon a straight line with the center of rotation (15) of said driven gearwheel (2).

4. The wheel drive according to claim 1, wherein said driven gearwheel (2) is in intermeshing connection with the at least two other gearwheels (6) which are in intermeshing connection with two gearwheels (19) which are in intermeshing connection with said outer central wheel (5) and whose centers of rotation lie upon a straight line.

5. The wheel drive according to claim 1, wherein an actuation device (13) of a brake (11) is disposed above in the axial area of said electric motor.

6. The wheel drive according to claim 1, wherein the at least two other gearwheels (6) which are in intermeshing connection with said driven gearwheel (2) are situated so that the angle (20) resulting from the connection of the centers of rotation of the at least said two other gearwheels (6) with the center of rotation (15) of said driven gearwheel (2) is smaller than or equal to 120°.

* * * * *